Sept. 8, 1970 R. B. HANSEN ET AL 3,527,964

PHASE SHIFTING CIRCUIT CONTROLLED BY A DIRECT CURRENT SIGNAL

Filed June 7, 1967 2 Sheets-Sheet 1

Inventor
ROBERT B. HANSEN
GORDON E. REICHARD.
BY Mueller, Aichele & Rauner
ATTYS.

Inventor
ROBERT B. HANSEN
GORDON E. REICHARD
BY Mueller, Aichele & Rauner
ATTYS.

3,527,964
PHASE SHIFTING CIRCUIT CONTROLLED BY A DIRECT CURRENT SIGNAL

Robert B. Hansen, Arlington Heights, and Gordon E. Reichard, Franklin Park, Ill., assignors to Motorola, Inc., Franklin Park, Ill., a corporation of Illinois Filed June 7, 1967, Ser. No. 644,208
Int. Cl. H04n 9/50; H03k 5/01
U.S. Cl. 307—262 4 Claims

ABSTRACT OF THE DISCLOSURE

A phase shifting circuit controlled by a direct current signal in which the input signal is divided into first and second signals. The second signal is shifted in phase in a direct current controlled phase shifter and the resultant phase shifted second signal is combined with the first signal to develop a phase shifted output signal. The direct current controlled phase shifting circuit also acts to change the amplitude of the phase shifted second signal as a function of the phase shift so that the output signal is maintained at a substantially constant amplitude.

BACKGROUND

In conventional phase shifting circuits the amount of phase shift is controlled by varying the impedance of one or more circuit elements. The impedances of the circuit elements are changed by controls and thus, remote operation of the phase shifting circuit is difficult to perform. The phase shifting circuit may be positioned at the remote location and the signal to be phase shifted may be coupled to the phase shifting network with special cabling. The special cabling could cause undesirable losses and phase distortion. Remotely operated mechanical controls incorporated in the phase shifting circuit are complex and expensive, particularly if a continuous control of phase shift rather than a stepped control is desired.

An example of a system requiring control of the phase shift of a signal is found in color TV receivers. Changing the phase of the 3.58 mHz. color reference signal changes the hues of the colors on the television screen. Thus control of the phase of the color reference signal permits the viewer to select the color hues most pleasing to him. Since very small changes in the phase angle of the color reference signal produce noticeable color changes it is important that the control be continuous. It is also desirable to be able to control the phase of the color reference signal without requiring that the signal be routed to the front of the receiver or that a mechanically complex drive shaft mechanism be provided to operate the phase shifting control from the front of the receiver. Where the receiver is to tbe operated remotely it is even more important that the control system be simple to avoid the requirement of special cabling or complex remotely operated mechanical systems.

SUMMARY

It is, therefore, an object of this invention to provide an improved phase shifting circuit which may be remotely operated without requiring special cabling.

Another object of this invention is to provide a phase shifting circuit which is mechanically simple in operation.

Another object of this invention is to provide a phase shifting circuit wherein the phase shifted output signal is substantially constant in amplitude.

In practicing this invention a phase control circuit is provided for shifting the phase of an output signal with respect to an input signal in response to a direct current control voltage. The input signal is divided into a first and second signal with the first signal being coupled to an adding circuit and the second signal being coupled to a phase shifting circuit. The phase shifting circuit includes phase shifting elements with at least one of the elements being responsive to a direct current control voltage so that the impedance of that element is changed to thereby shift the phase of the second signal.

The phase shifted second signal is coupled to the adding circuit and added to the first signal to develop the phase shifted output signal. The amplitude of the phase shifted second signal is changed as its phase changes so that the phasor sum of the phase shifted second signal and the first signal is substantially constant. By substantially constant it is meant that the amplitude of the signal is sufficiently constant to meet the requirements of a television hue control system, that is, no more than 10% variation in amplitude of the output signal. The phase shifting circuit may be comprised of a capacitive-resistive network wherein either the capacitance or the resistance is changed by the direct current control signal to provide the required phase shift. The first signal is shifted 180° in phase prior to the addition of the second phase shifted signal.

The invention is shown in the drawings of which:

DESCRIPTION OF THE INVENTION

Figure 1:
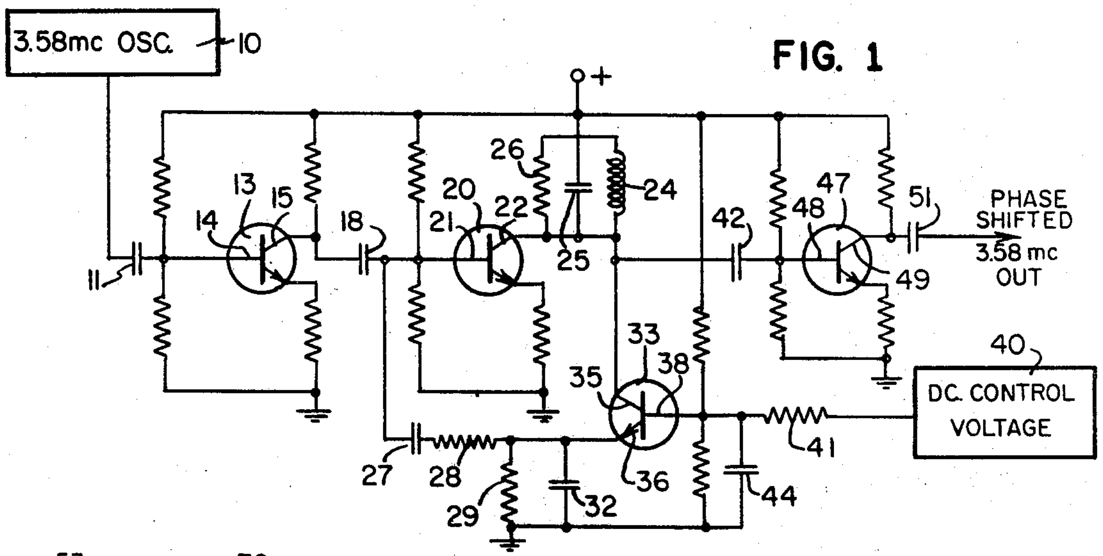
FIG. 1 is a partial schematic and partial block diagram of a circuit incorporating the features of the invention.

In FIG. 1 there is a partial block diagram and partial schematic of a hue control for a color television receiver incorporating the phase control system of this invention. The 3.58 mHz. oscillator 10 provides a 3.58 mHz. color reference signal which is coupled to base 14 of transistor 13 through capacitor 11. The output of transistor 13 is coupled from collector 15 to base 21 of transistor 20 through capacitor 18. The color reference signal is also coupled through capacitor 27 and resistor 28 to emitter 36 of transistor 33.

The output voltage from transistor 20 appears on collector 22 and is developed across the tuned circuit consisting of inductance 24, capacitor 25 and resistance 26. The tuned circuit 24, 25, 26 is tuned to the frequency of the color reference signal. In this example, the first signal appearing on collector 22 of transistor 20 is reversed in phase by 180° from the signal applied to emitter 36 of transistor 33.

Resistor 28 acts as a constant current generator for the color reference signal coupled to emitter 36 of transistor 33 and isolates the color reference signal input from phase changes at emitter 36. Resistor 29, capacitor 32 and the base-emitter resistance of transistor 33 act as a phase shifting network. It is known that the base-emitter resistance of a transistor varies as the base-emitter current through the transistor varies so that by controlling the bias current between base 38 and emitter 36 the resistance of one element of the phase shifting network can be controlled. By changing this resistance, the phase of the second color reference signal appearing on emitter 36 is varied.

A variable direct current control voltage from phase control unit 40 is coupled to base 38 through resistor 41. Capacitor 44 acts as a filter capacitor. Control unit 40 may be positioned at a remote location without increasing the complexity of the system since only direct current is required for control.

As the bias current from base 38 to emitter 36 of transistor 33 changes, the gain of transistor 33 also changes to change the amplitude of the phase shifted second signal. Thus both the phase and amplitude change simultaneously. Transistor 33 is connected as a grounded base amplifier so that there is no phase shift through transistor 33. The output from collector 35 is coupled to tuned circuit 24, 25, 26 and added to the first color reference signal appearing on collector 22 of transistor 20. The two signals are added and are coupled to base 48 of transistor 47 through capacitor 42. The resultant signal is amplified in transistor 47 and is coupled from collector 49 to utilization circuits by capacitor 51. Thus by changing the direct current control voltage applied to base 38 of transistor 33 the resultant output signal, appearing across tuned circuit 24, 25, 26, is shifted in phase and remains substantially unchanged in magnitude.

Figures 2, 3:
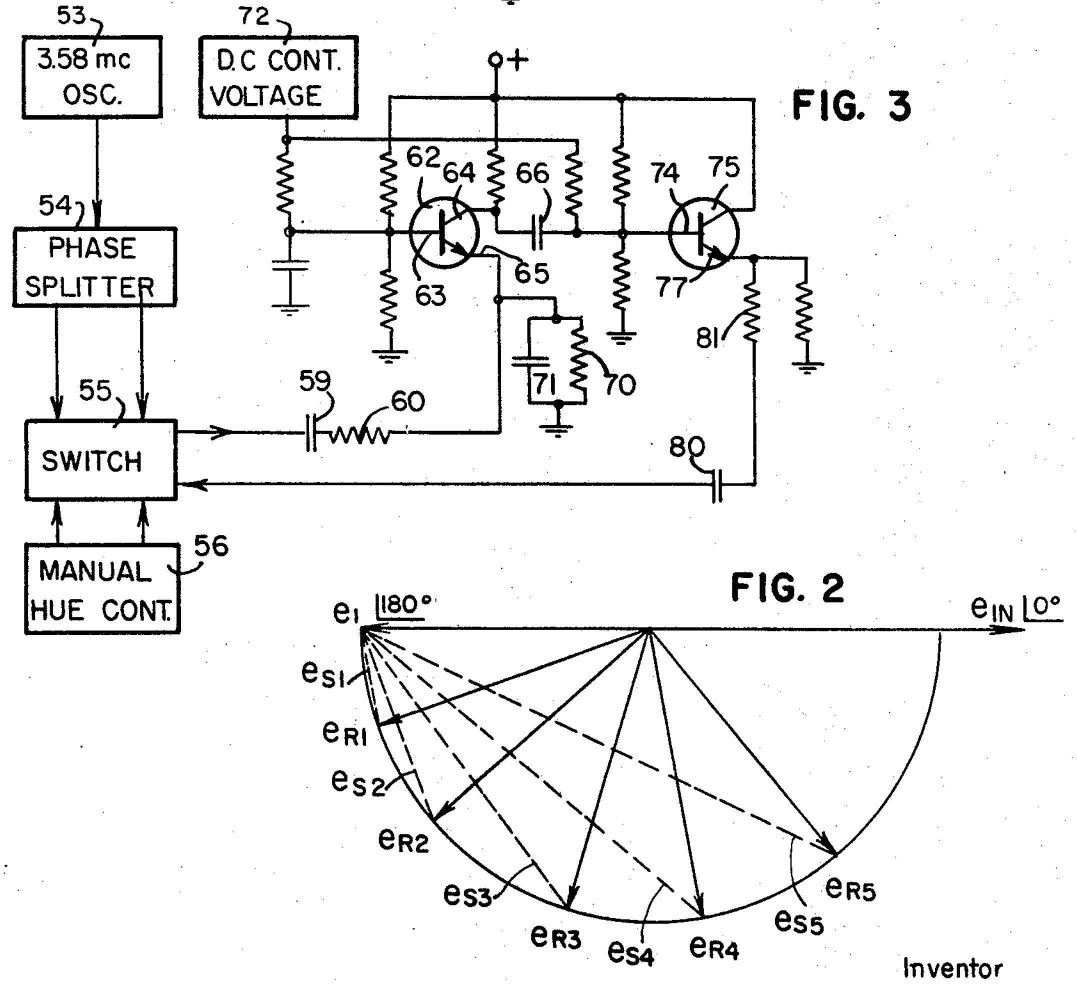
FIG. 2 is a phasor diagram showing the addition of the voltages to obtain the phase shifted output voltage.
FIGS. 3 and 4 and 5 are drawings separate embodiments of the circuit shown in FIG. 1.

FIG. 2 is a phasor diagram showing the addition of the first and second signals which takes place in the circuit of FIG. 1. The phasor $e_{in}$ represents the unshifted color reference signal which is applied to base 21 of transistor 20 and to constant current generator resistor 28. The color reference signal, applied through resistor 28 is shifted in phase by an amount which depends upon the direct current control voltage applied to base 38 of transistor 33. The phasors representing the different phase shifts are shown as $e_{s1}$ to $e_{s5}$. The signal $e_{in}$ is shifted in phase 180° by transistor 20 and is shown as $e_1$ in FIG. 2. Phasors $e_{s1}$ to $e_{s5}$ are added to phasor $e_1$ to produce the resultant signals $e_{R1}$ to $e_{R5}$. As the amount of phase shift is increased, the amplitude of the phase shifted signal decreases, as is shown by the phasors $e_{s1}$ to $e_{s5}$, where $e_{s1}$ represents the signal having the greatest phase shift. The addition of $e_1$ to to the phase shifted signals produces resultant signals having a substantially constant amplitude.

In FIG. 3 there is shown another embodiment of the circuit of FIG. 1. In FIG. 3 the 3.58 mHz. oscillator 53 is coupled to phase splitter 54 which develops a pair of signals, one being in phase with the output of oscillator 53 and the other being approximately 160° out-of-phase with the output of oscillator 53. Switch 55 couples one of the two color reference signals from phase splitter 54 to the hue control circuit or from phase splitter 54 to manual hue control 56. Manual hue control 56 combines the two out-of-phase reference signals to change the hue. In this example the two signals coupled out of switch 55 are the color reference signals from phase splitter 54 differing in phase by approximately 160°. One color reference signal is coupled to emitter 65 of transistor 62 through capacitor 59 and constant current resistor 60. Capacitor 71 and resistor 70 together with the base 63 to emitter 65 resistance of transistor 62 form a phase shifting network for the signal applied to emitter 65.

The direct current control voltage from phase control unit 72 is coupled to base 63 of transistor 62 and acts to control the bias current between base 63 and emitter 65. The magnitude of this control current determines the resistance presented to the phase shifting network by transistor 62. Thus varying the control voltage from phase control unit 72 varies the amount of phase shift of the signal appearing on emitter 65 of transistor 62.

This signal appearing on emitter 65 of transistor 62 is amplified by transistor 62 without further phase shift and appears on collector 64. This signal is coupled by capacitor 66 to base 74 of transistor 75. Transistor 75 is an emitter follower transistor so that the signal is coupled from base 74 to emitter 77 without further phase shift. The direct current control voltage from phase control unit 72 is also applied to base 74 of transistor 75 to vary the gain of this transistor to develop an additional correction to the amplitude of the phase shifter signal to minimize the change in amplitude of the output signal with changes in phase and allow the full hue range to be obtained by the biasing off of this stage.

The phase shifted signal on emitter 77 of transistor 75 is coupled through capacitor 80 and resistor 81 to switch 55 where it is added to the second signal to develop the phase shifted output signal.

Figure 4:
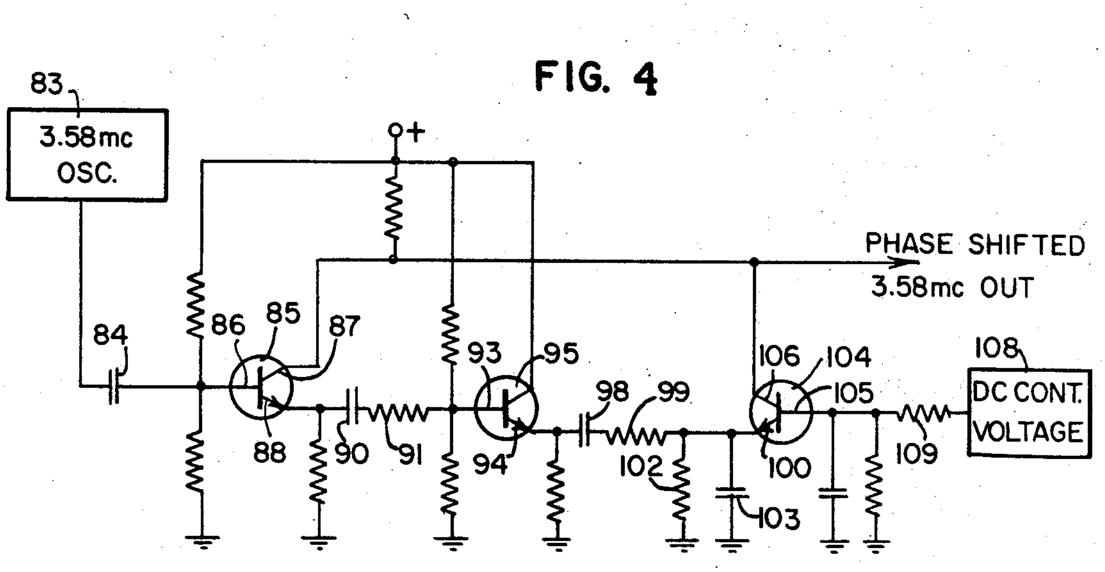

In FIG. 4 there is shown another embodiment of the circuit of FIG. 1. The color reference signal from 3.58 mHz. oscillator 83 is coupled to base 86 of transistor 85 through capacitor 84. Transistor 85 is connected as a phase splitter and a first signal, shifted in phase by 180°, appears on collector 87. A second signal, unshifted in phase, appears on emitter 88 and is coupled to base 93 of transistor 95 through capacitor 90 and resistor 91. The color reference signal appearing on base 93 is amplified and appears on emitter 94 of transistor 95 without a change in phase. The color reference signal on emitter 94 is coupled through capacitor 98 and constant current resistor 99 to emitter 100 of transistor 104. Resistor 102, capacitor 103 and the resistance between base 105 and emitter 100 of transistor 104 form a phase shifting network as previously described. The base-emitter current of transistor 104 determines the resistance presented by transistor 104 to the phase shifting network and thus determines the amount of phase shift of the color reference signal on emitter 100. The color reference signal is amplified by transistor 104 without further phase shift and appears on collector 106 where it is combined with the signal appearing on collector 87 of transistor 85. The two signals are added to develop the phase shifted output signal which is substantially constant in magnitude. A variable direct current control voltage is provided from phase control unit 108 and is coupled to base 105 through resistor 109.

Figure 5:
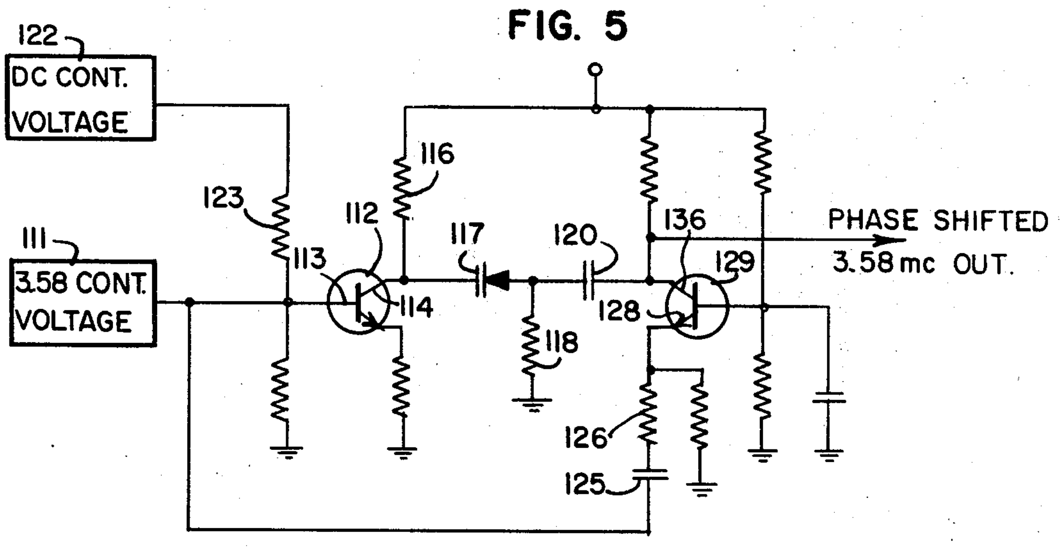

Referring to FIG. 5 there is shown another embodiment of the invention. The color reference signal from 3.58 mHz. oscillator 111 is coupled to base 113 of transistor 112. The color reference signal is reversed 180° in phase and is applied to the phase shifting network consisting of resistors 116 and 118 and voltage variable capacitor 117. The variable direct current control voltage from phase control unit 122 is supplied through resistor 123 to base 113 to bias the base-emitter junction of transistor 112 to regulate the current flow through transistor 112. The changes in current change the direct current voltage level appearing on collector 114 thus changing the bias voltage across voltage variable capacitor 117 and the capacitance of capacitor 117. Changing the bias on voltage variable capacitor 117 by changing the direct current control voltage from phase control unit 122 acts to vary the amount of phase shift of the color reference signal appearing on collector 130 of transistor 129. The changes in bias current also change the gain of transistor 112 to change the magnitude of the phase shifted signal as a function of phase shifted signal as a function of phase shift.

The color reference signal from oscillator 111 is also coupled to emitter 128 of transistor 129 through capacitor 125 and resistor 126. Transistor 129 is connected as a ground base amplifier and the signal applied to emitter 128 is amplified and appears on collector 130 unshifted in phase. The two signals at collector 130 are added to form the resultant output signal which is shifted in phase and is substantially constant in magnitude.

A phase shifting circuit has been provided which can be controlled by a direct current control voltage. The amplitude of the phase shifted output signal is held substantially constant, within 10%, as the phase is changed. The phase shifting circuit can be operated from a remote location without requiring special cabling or complex mechanical controls.

What is claimed is:

1. A phase control circuit for shifting the phase of an output signal with respect to an input signal in response to a direct current control voltage including in combination, first and second transistors each having collector, base, and emitter electrodes, means for supplying said input signal to the base of one of said transistors and for supplying said input signal to the emitter of the other of said transistors, means for applying a direct current control voltage to the base of one of the transistors, means for coupling the collectors of the first and second transistors together to provide said output signal and means responsive to said direct current control voltage applied to the base of said one transistor for controlling the relative phases of the signals from the collectors of the first and second transistors providing said output signal.

2. The combination according to claim 1 wherein the input signal is applied to the base of the first transistor and to the emitter of the second transistor, the base of the second transistor being connected in a grounded-base configuration, the direct current control voltage being coupled to the base of the first transistor, and the means for controlling the relative phases of the transistor collector signals being phase shifting means including voltage variable capacitor means, with the collectors of the first and second transistors being coupled together through said phase shifting means, the voltage variable capacitor means being responsive to the voltage thereacross to vary the capacitance thereof and thereby to vary the phase of the signal coupled from the collector of the first transistor to the collector of the second transistor.

3. A phase control circuit for shifting the phase of an output signal with respect to an input signal in response to a direct current control voltage including in combination, adding means, signal dividing means coupled to said adding means, said signal dividing means being adapted to receive the input signal and divide the same into first and second signals, first and second transistor means having collector, base, and emitter electrode, means for coupling the second signal to the emitter of the first transistor, phase shifting means coupled to the emitter of the first transistor and including capacitor means operating in conjunction with the base-to-emitter resistance of the first transistor to form a phase shifting network for signals applied to the emitter of the first transistor, means for supplying a direct current control voltage to the base of the first transistor to vary the base-emitter resistance thereof for controlling the amount of phase shift of the signal appearing on the collector of the first transistor with respect to the signal appearing on the emitter thereof, means coupling the signals on the collector of the first transistor to the base of the second transistor, means for coupling said direct current control voltage to the base of the second transistor for developing an additional correction of the amplitude of the signal obtained from the collector of the first transistor, and circuit means coupling the emitter of the second transistor to said adding means for applying said phase shifted second signal thereto, said adding means acting to ad said first signal and said phase shifted second signal to develop an output signal.

4. The combination according to claim 3 wherein the second signal is applied to the emitter of the first transistor through constant current means.

References Cited

UNITED STATES PATENTS

| | | | |
|---|---|---|---|
| 2,376,392 | 5/1945 | Shepherd | 328—155 |
| 2,414,475 | 1/1947 | Marchand | 328—155 |
| 2,531,474 | 11/1950 | Saxton | 328—155 |
| 2,606,966 | 8/1952 | Pawley | 333—28 XR |
| 2,753,519 | 7/1956 | Fischman | 328—155 |
| 2,958,832 | 11/1960 | Clark | 333—28 |
| 3,191,130 | 6/1965 | Rudd et al. | 332—29 |
| 3,215,927 | 11/1965 | Bronstein | 307—264 |
| 3,274,334 | 7/1966 | Hansen | 328—155 |
| 3,267,393 | 8/1966 | Brossard | 307—295 |
| 3,315,170 | 8/1967 | Baker | 328—155 |

DONALD D. FORRER, Primary Examiner

H. A. DIXON, Assistant Examiner

U.S. Cl. X.R.

328—155